(12) United States Patent
Sargent et al.

(10) Patent No.: US 9,090,779 B2
(45) Date of Patent: Jul. 28, 2015

(54) COMPOSITIONS FOR TREATING TEXTILE FIBERS AND FLOOR COVERINGS COMPRISING THE SAME

(71) Applicant: Peach State Labs, Inc., Rome, GA (US)

(72) Inventors: Ralph R Sargent, Rome, GA (US); Michael S Williams, Rome, GA (US); Michael Grigat, Rome, GA (US); Billy Lee Hullender, Tunnel Hill, GA (US); Steve Allen, Rome, GA (US)

(73) Assignee: PEACH STATE LABS, INC., Rome, GA (US)

( * ) Notice: Subject to any disclaimer, the term of this patent is extended or adjusted under 35 U.S.C. 154(b) by 204 days.

(21) Appl. No.: 13/760,590

(22) Filed: Feb. 6, 2013

(65) Prior Publication Data

US 2014/0106156 A1 Apr. 17, 2014

Related U.S. Application Data

(60) Provisional application No. 61/713,319, filed on Oct. 12, 2012.

(51) Int. Cl.
| | |
|---|---|
| C09D 5/00 | (2006.01) |
| C09D 4/02 | (2006.01) |
| D06M 15/256 | (2006.01) |
| D06M 15/263 | (2006.01) |
| D06M 15/233 | (2006.01) |
| D06M 15/277 | (2006.01) |
| D06M 15/31 | (2006.01) |
| D06M 15/353 | (2006.01) |
| D06M 15/507 | (2006.01) |
| D06M 15/564 | (2006.01) |
| D06M 15/576 | (2006.01) |
| D06M 15/59 | (2006.01) |
| D06M 15/647 | (2006.01) |
| A47G 27/00 | (2006.01) |

(52) U.S. Cl.
CPC .............. *C09D 5/00* (2013.01); *D06M 15/233* (2013.01); *D06M 15/263* (2013.01); *D06M 15/277* (2013.01); *D06M 15/31* (2013.01); *D06M 15/353* (2013.01); *D06M 15/507* (2013.01); *D06M 15/564* (2013.01); *D06M 15/576* (2013.01); *D06M 15/59* (2013.01); *D06M 15/647* (2013.01); *Y10T 428/249921* (2015.04)

(58) Field of Classification Search
None
See application file for complete search history.

(56) References Cited

U.S. PATENT DOCUMENTS

| | | | |
|---|---|---|---|
| 2002/0151644 A1 | 10/2002 | Williams | |
| 2003/0116744 A1 | 6/2003 | Kimbrell | |
| 2005/0038178 A1* | 2/2005 | Von Schmittou et al. | .... 524/556 |
| 2010/0311893 A1 | 12/2010 | Russo et al. | |

OTHER PUBLICATIONS

Aldrich, Thermal Transition Temperature of Homopolymers, accessed Feb. 24, 2015, https://www.sigmaaldrich.com/content/dam/sigma-aldrich/docs/Aldrich/General_Information/thermal_transitions_of_homopolymers.pdf.*
Notification of Transmittal of the International Search Report and the Written Opinion of the International Searching Authority for PCT Application No. PCT/US2013/064562, mailed Jan. 30, 2014, 10 pages.
Notification Concerning Transmittal of International Preliminary Report on Patentability for PCT Application No. PCT/US2013/064562, mailed Apr. 23, 2015, 8 pages.

* cited by examiner

*Primary Examiner* — Jennifer Chriss
*Assistant Examiner* — Frank Vineis
(74) *Attorney, Agent, or Firm* — J. Clinton Wimbish; Smith Moore Leatherwood LLP

(57) ABSTRACT

In one aspect, compositions are described herein which, in some embodiments, can improve or enhance the oil and soiling resistance of textile fibers, including fibers used in carpet and floor coverings. A composition described herein, in some embodiments, comprises a fluoropolymer component, a hydrophilic soil release polymeric component and a hardening component comprising one or more polymeric species having a glass transition temperature ($T_g$) greater than about 85° C.

15 Claims, No Drawings

COMPOSITIONS FOR TREATING TEXTILE FIBERS AND FLOOR COVERINGS COMPRISING THE SAME

RELATED APPLICATION DATA

The present application claims priority under 35 U.S.C. §119(e) to U.S. Provisional Patent Application Ser. No. 61/713,319, filed Oct. 12, 2012, which is incorporated herein by reference in its entirety.

FIELD

The present invention relates to compositions for treating textile fibers and, in particular, fibers used in carpets and floor covering products.

BACKGROUND

Manufactures of textiles are continuously searching for compositions to enhance textile fiber performance and durability. In the carpet and floor coverings industry, for example, manufacturers desire compositions operable to render carpet fibers resistant to oily stains and discoloration caused by soil accumulation. Fluorinated or perfluorinated alkyl compounds, when applied to fibers in sufficient amount, lower the surface energy of the fiber or fabric below the surface tension of water or oils that might be spilled onto the fabric. This allows these liquids to be removed before they can penetrate into the fiber or fabric. This is of great benefit for fibers and fabrics used in residential, commercial and industrial settings as the useful life of the fibers and fabric is substantially increased.

Similarly, soil release compositions have been developed for fibers and fabrics that assist or facilitate soil removal from the fibers and fabrics during cleaning. However, while being effective during cleaning operations, many soil release compositions demonstrate inferior performance in preventing or inhibiting fiber soiling. This is a particularly acute problem for hydrophobic textile fibers lacking ionic or sufficiently polar chemical functionalities to resist soil adherence. Further, the presence of a fluoropolymer component fails to mitigate problems encountered with fiber soiling.

The inability to effectively address fiber soiling has limited use of hydrophobic fibers in a variety of applications, including carpets and floor coverings. For example, polyester fibers, such as polyethylene terephthalate (PET) and polytrimethylene terephthalate (PTT), have found limited use in high traffic floor coverings can carpet due to the increased frequency of cleanings required to maintain an acceptable appearance of these fibers.

SUMMARY

In one aspect, compositions are described herein which, in some embodiments, can improve or enhance the oil and soiling resistance of textile fibers, including fibers used in carpet and floor coverings. A composition described herein, in some embodiments, comprises a fluoropolymer component, a hydrophilic soil release polymeric component and a hardening component comprising one or more polymeric species having a glass transition temperature ($T_g$) greater than about 85° C. A composition described herein, in some embodiments, further comprises an amphiphilic component comprising one or more surfactants, hydrotropic species or combinations thereof. In some embodiments, a composition described herein further comprises a stain block component.

In another aspect, textile compositions are described herein which, in some embodiments, demonstrate improved or enhanced resistance to oily stains and soiling. A textile composition described herein, in some embodiments, comprises fibers treated with a composition comprising a fluoropolymer component, a hydrophilic soil release component and a hardening component, wherein the hardening component comprises one or more polymeric species having a glass transition temperature ($T_g$) greater than about 85° C. In some embodiments, the composition with which the fibers are treated further comprises an amphiphilic component, the amphiphilic component comprising one or more surfactants, hydrotropic species or combinations thereof. As described further herein, the textile composition, in some embodiments, is carpet or other floor covering.

In a further aspect, methods of improving the oil and soiling resistance of textile fibers are described herein. In some embodiments, such a method comprises treating fibers with a composition comprising a fluoropolymer component, a hydrophilic soil release polymeric component and a hardening component, wherein the hardening component comprises one or more polymeric species having a glass transition temperature ($T_g$) greater than about 85° C. In some embodiments, the fiber treatment composition of a method described herein further comprises an amphiphilic component, the amphiphilic component comprising one or more surfactants, hydrotropic species or combinations thereof.

These and other embodiments are described in greater detail in the detailed description which follows.

DETAILED DESCRIPTION

Embodiments described herein can be understood more readily by reference to the following detailed description, examples, and drawings. Elements, apparatus, and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

The term "optionally substituted" means that the group in question is either unsubstituted or substituted with one or more of the substituents specified. When the groups in question are substituted with more than one substituent, the substituent may be the same or different.

The term "alkyl" as used herein, alone or in combination, refers to a straight or branched chain saturated monovalent hydrocarbon radical. In some embodiments, for example, alkyl groups include, but are not limited to, methyl, ethyl, n-propyl, isopropyl, n-butyl, sec-butyl, isobutyl, tert-butyl, n-pentyl, 2-methylbutyl, 3-methylbutyl, 4-methylpentyl, neopentyl, n-pentyl, n-hexyl, n-heptyl, n-octyl, 1,2-dimethylpropyl, 2,2-dimethylpropyl, 1,2,2-trimethylpropyl and the like. In some embodiments an alkyl group contains one to thirty carbon atoms.

The term "aryl" as used herein refers to a carbocyclic aromatic ring radical or to an aromatic ring system radical. Aryl is also intended to include the partially hydrogenated derivatives of the carbocyclic systems.

I. Compositions for Treating Textile Fibers

A composition for treating textile fibers described herein, in some embodiments, comprises a fluoropolymer component, a hydrophilic soil release polymeric component and a hardening component comprising one or more polymeric species having a glass transition temperature ($T_g$) greater than about 85° C. A composition described herein, in some embodiments, further comprises an amphiphilic component comprising one or more surfactants, hydrotropic species or combinations thereof. In some embodiments, a composition for treating textile fiber having the foregoing components is provided as an aqueous dispersion or aqueous-based dispersion.

Turning now to specific components, a composition described herein comprises a fluoropolymer component comprising one or more fluoropolymer species. In some embodiments, fluoropolymers suitable for use in a composition described herein comprise perfluorinated polyurethanes, perfluorinated polyacrylate copolymers, perfluorinated urethane-acrylic copolymers, fluoroalkyl methacrylates, fluoroalkyl acrylates, fluoroalkyl aryl urethanes, aliphatic fluoroalkyl urethanes, fluoroalkyl allyl urethanes, fluoroalkyl urethane acrylates, fluoroalkyl acrylamides, fluoroalkyl sulfonamide acrylates, fluoroalkyl sulfonamide methacrylates, fluoroalkyl sulfonamide urethanes, fluoroalkylesters, fluoroesters or fluoroethers or mixtures thereof. Suitable fluoropolymers, in some embodiments, also comprise polytetrafluoroethylene (PTFE), fluorinated ethylene-propylene (FEP), perfluoroalkoxy resin (PFA), polychlorotrifluoroethylene (PCTFE), ethylene-tetrafluoroethylene (EPTFE), polyvinylidene fluoride (PVDF) or polyvinyl fluoride (PVF) or mixtures thereof. In some embodiments, the fluoropolymers are crosslinked through cross-linking moieties.

The fluoropolymer component, in some embodiments, comprises one or more fluoropolymer species of the formula (I):

$$R_f\text{—}R^1\text{—}P \quad (I)$$

wherein P is a polymerizable moiety, $R_f$ is a straight chain or branched perfluoroalkyl group and $R^1$ is selected from the group consisting of alkyl, aryl, -alkyl-aryl-, -aryl-alkyl- and -alkyl-O-alkyl-. $R_f$, in some embodiments, is $<C_8$, such as $C_4$ to $C_6$. Alternatively, $R_f$ can be $C_4$ to $C_{20}$.

P, in some embodiments, comprises a site of unsaturation operable to undergo radical polymerization. In one embodiment, for example, P comprises a vinyl functionality, allyl functionality, acrylic functionality or methacrylic functionality. In other embodiments, P comprises a functionality operable to undergo condensation polymerization, such as an isocyanate or hydroxyl functionality.

The fluoropolymer component, in some embodiments, is provided as an aqueous dispersion or emulsion comprising fluoropolymer particles. The fluoropolymer particles can have an average size ranging from about 30 nm to about 200 nm. In some embodiments, fluoropolymer particles have an average size ranging from about 40 nm to about 100 nm or from about 50 nm to about 70 nm.

Fluoropolymers suitable for use in fiber treatment compositions described herein, in some embodiments, are commercially available from Peach State Labs of Rome, Ga. under the Sartech trade designation including, but not limited to, Sartech GEO 8168, Sartech GEO 600 and/or Sartech GEO 83. Additionally, suitable fluoropolymers are commercially available from Daikin Industries, Inc. of Osaka Japan under the UNIDYNE® trade designation including, but not limited to, TG7114, TG2113, TG2112, TG581, TG7411 and TG2213. In some embodiments, suitable fluoropolymers are commercially available form DuPont of Wilmington, Del. under the ZONYL® and OLEOPHOBOL® trade designations. Further, suitable fluoropolymers are commercially available from Clariant, Inc. of Charlotte, N.C. under the NUVA® trade designation or from Asahi Glass of Tokyo, Japan under the ASAHIGUARD® E-Series trade designation.

The fluoropolymer component can be present in a treatment composition described herein in various amounts depending on several factors including, but not limited to, the desired oil repellency of fibers treated with the composition and the phase stability or balance of the composition. The fluoropolymer component, in some embodiments, is present in a composition described herein at add-on levels according to Table I.

TABLE I

| Fluoropolymer Component |
|---|
| Amount Fluoropolymer - on weight fiber (owf) |
| 0.01-3.0% |
| 0.02-2.5% |
| 0.10-1.5% |
| 0.20-1.0% |

As described herein, a composition for treating textile fibers also comprises a hydrophilic soil release polymeric component. The hydrophilic soil release polymeric component can include a variety of hydrophilic or water-dispersible polymeric species demonstrating soil release properties. Hydrophilic polymeric species of the soil release component can be cationic, anionic or non-ionic.

The soil release component, in some embodiments, comprises hydrophilic or water-dispersible polyester. Hydrophilic polyesters, in some embodiments, comprise ethoxylated polyesters, propoxylated polyesters, sulfonated polyesters, ethoxylated/sulfonated polyesters or mixtures thereof. The hydrophilic polyesters can be non-ionic or anionic. Suitable hydrophilic or water-dispersible polyesters, for example, are commercially available from Clariant, Inc. of Charlotte, N.C. under the HYDROPERM® or MILEASE® trade designation, including HYDROPERM® T, MILEASE® T and MILEASE® HPA.

In some embodiments, hydrophilic polyesters of the soil release component are based on polytrimethylene terephthalate (PTT), including PTT used to make fibers under the United States Federal Trade Commission classification triexta. PTT, for example, can be modified with one or more hydrophilic species to provide a hydrophilic soil release component. In some embodiments, PTT is ethoxylated, propoxylated and/or sulfonated to provide a hydrophilic soil release component. Water dispersibility and other properties of hydrophilic PTT can be largely controlled by the identity and amount of modifying hydrophilic species. In some embodiments, PTT can be ethoxylated with polyethylene glycols (PEG) of varying chain length and/or molecular weight to achieve desired levels of hydrophilicity and water dispersibility. Additionally, polypropylene glycols (PPG) can be used in conjunction with PEGs, such as in EO/PO block copolymers, to achieve desired levels of hydrophilicity and water dispersibility of PTT.

Further, in some embodiments, hydrophilic polyesters of the soil release component are based on copolymer of PTT and PET. Such PTT/PET copolymers can also be modified with one or more hydrophilic species described herein to provide a hydrophilic soil release component.

The soil release component, in some embodiments, comprises hydrophilic polyurethane, such as hydrophilic polyurethane under the HYROPERM® RPU trade designation from Clariant, Inc. The soil release component, in some embodiments, comprises hydrophilic polyamide, such as hydrophilic polyamide under the LUROTEX® A-25 trade designation from BASF of Charlotte, N.C. Additionally, in some embodiments, the soil release component comprises acrylate polymers, acrylate copolymers or hydrophilic polysiloxanes.

The hydrophilic soil release polymeric component can be present in a composition described herein in various amounts depending on several factors including, but not limited to, the identity and desired soil release properties of the fibers to be treated with the composition and the phase stability or balance of the composition. The hydrophilic soil release polymeric component, in some embodiments, is present in a composition described herein at add-on levels according to Table II.

TABLE II

Hydrophilic Soil Release Polymeric Component
Amount Hydrophilic Soil Release Component - on weight fiber (owf)

0.01-3.0%
0.02-2.0%
0.05-1.5%
0.20-1.0%

In addition to the fluoropolymer component and hydrophilic soil release polymeric component, a fiber treatment composition described herein also comprises a hardening component comprising one or more polymeric species having a glass transition temperature ($T_g$) greater than about 85° C. The polymeric species, in some embodiments, can have a $T_g$ greater than about 90° C. or greater than about 100° C. The polymeric species can have a $T_g$ greater than about 110° C. or greater than about 150° C.

The hardening component, in some embodiments, comprises a plurality of polymeric species, each having a $T_g$ greater than about 85° C. The presence of a plurality of polymeric species, in some embodiments, can permit tailoring of the hardening component to have a desired average $T_g$. In some embodiments, for example, an average $T_g$ provided by the mixture of polymeric species would not be otherwise obtainable with an individual polymeric species, thereby permitting tailoring of hardening component properties to various fiber applications.

In some embodiments, polymeric species of the hardening component are water-insoluble. Alternatively, polymeric species of the hardening component can be water-soluble or water-dispersible.

In some embodiments, a polymeric species of the hardening component comprises an acrylate polymer. Suitable acrylate polymers can comprise monomeric species of acrylic acid, alkyl-acrylate, aryl-acrylate, alkyl-methacrylate or aryl-methacrylate. Alkyl-acrylate or aryl-acrylate monomer of hardening component polymeric species, in some embodiments, are of formula (II):

$$CH_2\!=\!CHC(O)OR^2 \quad\quad\quad (II)$$

wherein $R^2$ is $C_1$ to $C_{20}$-alkyl or aryl, wherein the aryl is optionally substituted with -alkyl. Similarly, alkyl-methacrylate or aryl-methacrylate monomer of hardening component polymeric species can be of formula (III)

$$CH_3CH_2\!=\!CHC(O)OR^3 \quad\quad\quad (III)$$

wherein $R^3$ is $C_1$ to $C_{20}$-alkyl or aryl, wherein the aryl is optionally substituted with -alkyl. In some embodiments, for example, acrylate monomer of the hardening component polymeric species is selected from the group consisting or methacrylic acid, methyl-methacrylate, t-butyl methacrylate, isobornyl methacrylate, phenyl methacrylate and combinations thereof.

A polymeric species of the hardening component, in some embodiments, comprises an acrylate copolymer. An acrylate copolymer, in some embodiments, comprises two or more of the acrylate monomeric species described herein. Alternatively, an acrylate copolymer can comprise one or more acrylate monomeric species and one or more non-acrylate monomeric species. In some embodiments, suitable non-acrylate monomeric species include styrene, styrene derivatives, vinyl chloride, vinylidene chloride, vinyl acetate, acrylonitrile and acrylonitrile derivatives. For example, a suitable acrylate copolymer, in some embodiments, is formed of one or more acrylate monomeric species and styrene, such as methacrylic acid, methyl methacrylate and styrene. Additionally, suitable acrylate copolymers of the hardening component are described in U.S. Pat. No. 6,524,492 which is hereby incorporated by reference in its entirety.

Alternatively, in some embodiments, a polymeric species of the hardening component comprises polyacrylonitrile or polyacrylonitrile copolymer. Comonomer for polyacrylonitrile copolymer, in some embodiments, includes styrene or styrene derivatives. Further, in some embodiments, a polymeric species of the hardening component is not a fluoropolymer.

The hardening component can be provided as an emulsion or aqueous dispersion of the polymeric species. Particles of hardening component polymeric species can have an average size ranging from about 30 nm to about 250 nm. In some embodiments, polymeric particles of the hardening component have an average size ranging from about 40 nm to about 200 nm or from about 50 nm to about 150 nm. Additionally, particles of hardening component polymeric species can have an average size ranging from about 100 nm to about 200 nm.

The hardening component can be present in a composition described herein in various amounts depending on several factors including, but not limited to, the desired anti-soiling and oil resistance properties of fibers treated with the composition and the phase stability or balance of the composition. As detailed in the examples presented herein, addition of the hardening component to the fiber treatment composition comprising the fluoropolymer and hydrophilic soil release components provides unexpected enhancement oil resistance and soil release properties of fibers treated with the composition, including enhancement of fiber resistance to initial soiling. The hardening component, in some embodiments, is present in a composition described herein at add-on levels according to Table III.

TABLE III

Hardening Component
Amount Hardening Component - on weight fiber (owf)

0.01-2.0%
0.015-1.5%
0.02-1.0%
0.03-0.9%

In some embodiments of compositions described herein, the hardening component and the hydrophilic soil release component are provided as a product of polymerizing polymer of the hardening component in the presence of the hydrophilic soil release polymeric component. Conducting polymerization of polymer of the hardening component in the presence of the hydrophilic soil release polymeric component, in some embodiments, can associate the hardening component polymer with the one or more hydrophilic polymeric species of the soil release component. In some embodiments, such a polymerization may produce particles having phases of the hardening component polymer and the hydrophilic polymer of the soil release component. The polymeric phases of a particle, in some embodiments, may interpenetrate with one another. In one embodiment, for example, acrylate monomeric species, such as alkyl-methacrylate and/or methacrylic acid, are copolymerized with non-acrylate monomeric species, such as styrene or styrene derivatives, in the presence of a hydrophilic polymeric species, such as a hydrophilic polyester, hydrophilic polyurethane or hydrophilic polyamide. In some embodiments, acrylate monomeric species, such as alkyl-methacrylate and/or methacrylic acid, are copolymerized with non-acrylate monomeric species, such as styrene or styrene derivatives, in the presence of hydrophilic PTT or hydrophilic polyethylene terephthalate (PET) of the soil release component.

In some embodiments wherein the hardening component polymer is polymerized in the presence of the hydrophilic soil release polymeric component, the amount of soil release component present during the polymerization is consistent with that provided in Table II herein. Alternatively, in some embodiments, a reduced amount of hydrophilic soil release polymeric component is provided in the polymerization mixture, and the remainder of the hydrophilic soil release polymeric component is added subsequent to polymerization to provide add-on levels according to Table II. Adding hydrophilic soil release polymeric component subsequent to polymerization of the hardening component polymer, in some embodiments, can permit the added portion to remain independent of association(s) with the hardening component polymer.

Further, in some embodiments wherein hardening component polymer is polymerized in the presence of the hydrophilic soil release component, monomer sufficient to produce only a portion of the desired amount of hardening polymer is used in the polymerization. Hardening polymer produced in the absence of the hydrophilic soil release polymeric component is subsequently added to achieve the desired amount of hardening component for the composition as set forth in Table III. Adding hardening polymer subsequent to the polymerization, in some embodiments, can permit the added portion to remain independent of association(s) with the polymeric species of the hydrophilic soil release component.

In some embodiments, compositions described herein further comprise an amphiphilic component comprising one or more surfactants, hydrotropic species or combinations thereof. The amphiphilic component, while not required in all embodiments of compositions described herein, can be added to the composition to assist or increase phase stability between the fluoropolymer, hydrophilic soil release and hardening components. Suitable surfactants for the amphiphilic component, in some embodiments, comprise alkyldiphenyloxide disulfonate surfactants and salts thereof. Such surfactants are commercially available from Dow Chemical Co. of Midland, Mich. under the DOWFAX® trade designation. In one embodiment, for example, a surfactant of the amphiphilic component is DOWFAX® 2A1. Alkyldiphenyloxide disulfonate surfactants for use as the amphiphilic component are also commercially available from Pilot Chemical Co. of Cincinnati, Ohio under the CALFAX® trade designation, including CALFAX® 10L Series and 16L Series surfactants.

The amphiphilic component, in some embodiments, comprises xylene sulfonic acid and/or salts thereof. Suitable xylene sulfonic acid species are commercially available from Pilot Chemical Co. under the PILOT® SXS-40 trade designation or from Nease Performance Chemicals of Cincinnati, Ohio under the XSA-90 and XSA-65 trade designations. Additionally, in some embodiments, the amphiphilic component comprises cumene sulfonic acid and/or salts thereof. Cumene sulfonic acid is also available from Nease Performance Chemicals under the NAXONATE® SC series trade designation. Further, the amphiphilic component can comprise alkyl benzene sulfonic acids and/or salts thereof. Alkyl benzene sulfonic acids are commercially available from Pilot Chemical Co. under the CALSOFT® trade designation.

The amphiphilic component can be present in a fiber treatment composition described herein in various amounts depending on several factors including, but not limited to, the amounts of the other components of the composition and the desired phase stability or balance of the composition. The amphiphilic component, in some embodiments, is present in a composition described herein at add-on levels according to Table IV.

TABLE IV

Amphiphilic Component
Amount Amphiphilic Component - on weight fiber (owf)

0.01-1.0%
0.02-0.8%
0.03-0.4%
0.04-0.15%

Compositions for treating textile fibers described herein, in some embodiments, further comprise a stain block component. Stain block component can be included in compositions described herein when treating fibers having chemical structures or moieties susceptible to aqueous based stains. Polyamide (nylon) fibers, for example, demonstrate chemical properties susceptible to aqueous based stains.

The stain block component, in some embodiments, comprises one or more species of sulfonated aromatic condensates (SAC). Suitable sulfonated aromatic condensates are commercially available from Clariant Inc. under the NYLOFIXAN® trade designation or from Lanxess AG of Leverkusen, Germany under the MESITOL® trade designation. Sulfonated aromatic condensates are also commercially available from Peach States Labs, Inc. of Rome, Ga. under the Myafax Series and PSL Series trade designations. In some embodiments, suitable chemical species for the stain block component are described in U.S. Pat. Nos. 5,464,911; 5,015,259 and 4,940,757 each of which is incorporated herein by reference in its entirety.

The stain block component can be present in a composition described herein in various amounts depending on several factors including, but not limited to, the chemical identity of the fibers to be treated and the desired phase stability or balance of the composition. The stain blocking component, in some embodiments, is present in a composition described herein at add-on levels according to Table V.

TABLE V

Stain Block Component
Amount Stain Blocking Component - on weight fiber (owf)

0.1-3.0%
0.2-2.0%
0.3-1.5%
0.4-1.0%

II. Textile Compositions

In another aspect, textile compositions are described herein which, in some embodiments, demonstrate improved or enhanced resistance to oily stains and soiling. A textile composition described herein, in some embodiments, comprises fibers treated with a composition comprising a fluoropolymer component, a hydrophilic soil release component and a hardening component, wherein the hardening component comprises one or more polymeric species having a glass transition temperature ($T_g$) greater than about 85° C. In some embodiments, the composition with which the fibers are treated further comprises an amphiphilic component, the amphiphilic component comprising one or more surfactants, hydrotropic species or combinations thereof. Further polymeric species of the hardening component, in some embodiments, are water-insoluble. Alternatively, polymeric species of the hardening component can be water-soluble or water-dispersible.

Fibers of textile compositions described herein can comprise synthetic fibers, natural fibers or mixtures thereof. Synthetic fibers of a textile composition described herein can comprise polyester fibers, polyamide fibers, polyolefin fibers, polyacrylonitrile fibers or blends or mixtures thereof. Polyester fibers, in some embodiments, comprise polytrimethylene terephthalate (PTT) fibers, polyethylene terephthalate (PET) fibers, polybutylene terephthalate (PBT) fibers or blends or mixtures thereof. Polyamide fibers, in some embodiments, comprise nylon-6, nylon-6,6 or blends or mixtures thereof. Polyolefin fibers, in some embodiments, comprise polyethylene, polypropylene or blends or mixtures thereof. Natural fibers can comprise cellulose, cellulose derivatives, wool, silk or mixtures thereof.

Treatment compositions applied to fibers of textile compositions described herein can have any of the compositional parameters and/or properties described in Section I hereinabove. For example, a treatment composition applied to fibers of a textile composition can comprise any fluoropolymer component, hydrophilic soil release polymeric component, hardening component and, optionally, amphiphilic component described in Section I hereinabove. In some embodiments, polymeric species of the hydrophilic soil release component are associated with polymer of the hardening component resulting from polymerization of the hardening polymer in the presence of the hydrophilic soil release component as described in Section I herein. The treatment composition may further comprise a stain block component when treating fibers susceptible aqueous based stains. Further, each of the foregoing components of the treatment composition can be present on fibers of the textile composition at add-on levels provided in Tables I-V herein.

Textile compositions comprising the treated fibers, in some embodiments, are floor coverings, including carpet constructions. For example, a textile composition comprises a floor covering having a backing and fibers coupled to the backing, wherein the fibers are treated with a composition described in Section I hereinabove. Fibers of the floor covering can comprise any fiber described in this Section II. In one embodiment, a carpet construction comprises a backing and polyester fibers coupled to the backing, the polyester fibers treated with a composition comprising a fluoropolymer component, a hydrophilic soil release polymeric component, a hardening component and optionally an amphiphilic component, wherein the hardening component comprises one or more polymeric species having a glass transition temperature ($T_g$) greater than about 85° C. and the amphiphilic component comprises one or more surfactants, hydrotropic species or combinations thereof. The polyester fibers can be PTT, PET, PBT or mixtures of blends thereof. Additionally, in some embodiments, a textile composition is upholstery, wherein the upholstery fibers are treated with a composition described in Section I herein.

Fibers treated with a composition described in Section I herein, in some embodiments, demonstrate a soil release rating of at least 3.5 according to American Association of Textile Chemists and Colorists (AATCC) Test Method 130. The treated fibers, in some embodiments, demonstrate a soil release rating of at least 4 according to AATCC 130.

Additionally, in some embodiments, fibers treated with compositions described in Section I herein demonstrate release of used/spent motor oil according to the following testing protocol (Motor Oil Test). Five (5) drops of used or spent motor oil are dropped on the surface of the textile composition comprising the treated fibers. A sheet of wax paper is placed over the oil spot on the fibers and a 5 pound weight is placed on the wax paper at the location of the oil spot. The 5 pound weight and wax paper are removed after a time period of 1 minute, and the fibers are allowed to set for 15 minutes. The fibers having the motor oil applied thereto are hand washed for 15 seconds with a 1 g/L solution of tridecyl alcohol with 9 moles ethoxylation, the solution having a temperature of 55° C. The fibers are rinsed in cold tap water, extracted and dried. Staining of the treated fibers by the motor oil after the cleaning is evaluated in accordance with AATCC 130. For example, a rating of 5 for the fibers indicates the absence of staining, and a rating of 1 indicates considerable oil staining.

Fibers treated with a composition described in Section I herein, in some embodiments, demonstrate a rating of at least 4 according to the foregoing Motor Oil Test. In some embodiments, the treated fibers demonstrate a rating of 5 according to the Motor Oil Test. Further, fibers treated with a composition described in Section I herein, in some embodiments, demonstrate a water/alcohol repellency of at least 5 according to AATCC 193.

Additionally, in some embodiments, fibers treated with a composition described in Section I herein demonstrate an oil repellency rating according to AATCC 118 of at least 3 or at least 4. Such treated fibers, in some embodiments, display a rating of at least 5 according to AATCC 118.

III. Methods of Improving Oil and Soiling Resistance of Textile Fibers

In a further aspect, methods of improving the oil and soiling resistance of textile fibers are described herein. In some embodiments, such a method comprises treating fibers with a composition comprising a fluoropolymer component, a hydrophilic soil release polymeric component and a hardening component, wherein the hardening component comprises one or more polymeric species having a glass transition temperature ($T_g$) greater than about 85° C. In some embodiments, the fiber treatment composition of a method described herein further comprises an amphiphilic component, the amphiphilic component comprising one or more surfactants, hydrotropic species or combinations thereof.

Treatment compositions applied to textile fibers for improving or enhancing oil and soiling resistance can have any of the compositional parameters and/or properties described in Section I hereinabove. For example, a treatment composition applied to the fibers can comprise any fluoropolymer component, hydrophilic soil release polymeric component, hardening component and, optionally, amphiphilic component described in Section I hereinabove. The treatment composition may further comprise a stain block component when treating fibers susceptible aqueous based stains. Further, each of the foregoing components of the treatment composition can be present on fibers of the textile composition at add-on levels provided in Tables I-V herein.

In some embodiments of methods described herein, treatment compositions of Section I are applied to textile fibers in a foam-drying application. In this application process, components of the treatment composition (fluoropolymer component, hydrophilic soil release polymeric component, hardening component and optionally the amphiphilic component and/or stain block component) are blended into a single mixture at concentrations necessary to achieve the desired add-on levels according to Tables I-V herein at a wet pick up to be applied by the foam. The resulting mixture is processed to create the foam. The foam, for example, can be created by various techniques including mechanical agitation and/or compressed air injection. The foam is applied to the fibers at a rate sufficient to achieve the desired add-on of the components of the mixture. In some embodiments, for example, the foam is applied to the fiber side of a floor covering or applied to the face of a fabric or upholstery. Subsequent to foam application, the fibers can be subjected to rolling, such as squeeze rolling, to enhance uniformity and penetration of the components of the treatment composition on the fibers. The fibers are then dried.

In some embodiments of methods described herein, treatment compositions of Section I are applied to textile fibers in a pad/steam/rinse dry application. In this application process, components of the treatment composition (fluoropolymer component, hydrophilic soil release polymeric component, hardening component and optionally the amphiphilic component and/or stain block component) are blended into a mixture at concentrations necessary to achieve the desired add-on levels according to Tables I-V herein at a wet pick up to be applied by pad application. In pad application, wet pick up can range from 100-600% wet pick up of the application bath comprising the treatment composition. The treatment composition is applied to the textile fibers at the desired wet pick up, and the fibers are passed through a steam heating chamber for a period of time sufficient to exhaust the components of the treatment composition on the fibers. In some embodiments, for example, steam heating is administered for a period of 1 to 10 minutes at a temperature of 90-110° C. The fibers are then rinsed, extracted and dried.

Further, in some embodiments of methods described herein, treatment compositions of Section I are applied to textile fibers in a multiple step process. In a multiple step process, component subsets of the treatment composition are applied in steps until all the components of the treatment composition are applied to the fibers. In one embodiment, for example, the hydrophilic soil release polymeric component is applied to the fibers in a pad/steam/rinse dry application and the remaining fluoropolymer and hardening components and optionally the amphiphilic and/or stain block components are applied in a separate a pad/steam/rinse dry application or foam application. In some embodiments, the fibers are not dried between application steps of the component subsets and only dried after application of the final component subset. Any and all subset combinations of treatment composition components are contemplated herein. In some embodiments, for example, the hydrophilic soil release polymeric component and hardening component are applied as a subset when polymer of the hardening component is polymerized in the presence of the hydrophilic soil release component.

Treatment compositions of Section I, in some embodiments, are applied at pH values sufficiently mild to preclude or inhibit fiber damage. Treatment compositions, for example, can be applied at a pH of 3.0 to 5.5 or 4.0 to 5.5. In some embodiments, however, the treatment compositions can be applied at a pH of less than 3.0.

The textile fibers treated according to methods described herein, in some embodiments, can demonstrate any of the performance properties described in Section II hereinabove. For example, in some embodiments, textile fibers treated according to methods described herein can demonstrate a soil release rating of at least 3.5 according to AATCC 130. The treated fibers, in some embodiments, demonstrate a soil release rating of at least 4 according to AATCC 130. Further, the treated fibers, in some embodiments, demonstrate a rating of at least 4 or 5 according to the Motor Oil Test.

These and other embodiments are further illustrated in the following non-limiting examples.

Example 1

Treatment and Performance Polytrimethylene Terephthalate (PTT) Carpets

Eight (8) PTT carpet samples were fabricated with solution dyed PTT. Treatment compositions having components at add-on levels set forth in Table VI were applied to the PTT fibers of the carpet samples, wherein each PTT carpet sample received only one treatment composition.

TABLE VI

Treated PPT Carpet Samples

| PTT Carpet Sample | Fluoropolymer GEO 83 0.05-1.0% owf | Hydrophilic Soil Release Hydroperm T 0.05-1.0% owf | Hardening Component Polymer 52DM* 0.3-0.65% owf | Amphiphilic component Dowfax 2A1 0.02-0.15% owf |
|---|---|---|---|---|
| 1 | x | — | — | x |
| 2 | — | x | — | x |
| 3 | — | — | x | x |
| 4 | x | x | — | x |
| 5 | x | — | x | x |
| 6 | — | x | x | x |
| 7 | x | x | x | x |
| 8 | — | — | — | — |

*Available from Peach States Labs, Rome GA

Polymer 52DM is an acrylate-styrene copolymer as described in U.S. Pat. No. 6,524,492 referenced herein. The treatment compositions of Table VI were applied to the PTT carpet samples by a foam application bath at 25% wet pick up. An individual application bath was prepared for each treatment composition. Components of each treatment composition were present in the foam application bath in an amount sufficient to provide the listed add-on level (owf) at 25% wet pick up. Each foam application bath was foamed with a KitchenAid mixer until a consistent, thick foam was produced. Each foam was then applied to an individual PTT carpet sample in an amount equal to 25% of the weight of the carpet sample. Each PTT carpet sample was passed through a squeeze roll to collapse the foam and enhance application. Each sample was dried in a Blue-M lab oven at 120° C. Once a sample was dry, a latex was applied to the back of the sample and cured at 120° C. The latex was applied to give the samples stability during subsequent testing.

The 8 treated PTT carpet samples were subjected to the Motor Oil Test as set forth in Section II herein. The 8 treated PPT carpet samples were also subjected to soil release testing in accordance with AATCC 130. The results of the testing are provided in Table VII.

TABLE VII

Motor Oil and Soil Release Testing Results

| | PTT Sample | | | | | | | |
|---|---|---|---|---|---|---|---|---|
| | 1 | 2 | 3 | 4 | 5 | 6 | 7 | 8 |
| Motor Oil Test | 5 | 1 | 1 | 4 | 4 | 1 | 5 | 1 |
| Soil Release (AATCC 130) | 1 | 2 | 3.5 | 1 | 2 | 4.5 | 4 | 1 |

As provided in Table VII, the PTT carpet sample (7) treated with a composition described herein comprising a fluoropolymer component, hydrophilic soil release polymeric component, hardening component and amphiphilic component demonstrated superior results in the Motor Oil Test and soil release testing. The remaining PTT carpet samples were deficient in one or both of the Motor Oil and soil release testing. Further the PTT carpet sample treated with a composition described herein displayed superior resistance to soiling in comparison to the remaining PTT examples. Soil applied to the PTT sample comprising a composition described herein did not adhere or substantially adhere to the PTT fibers and settled on the carpet backing at the base of the fibers. In resisting the applied soil, the PTT fibers did not discolor as in the other samples.

Example 2

Treatment and Performance Polyamide (Nylon-6) Carpets

Eight (8) Nylon-6 carpet samples were prepared with treatments having components at add-on levels set forth in Table VIII, wherein each carpet sample received only one treatment composition.

TABLE VIII

Treated Nylon-6 Carpet Samples

| Nylon-6 Carpet Sample | Fluoropolymer GEO 83 0.05-1.0% owf | Hydrophilic Soil Release Hydroperm T 0.05-1.0% owf | Hardening Component Polymer 52DM* 0.3-0.65% owf | Amphiphilic component Dowfax 2A1 0.02-0.15% owf | Stain Block Component 0.1-1.0% owf |
|---|---|---|---|---|---|
| 1 | x | — | — | x | x |
| 2 | — | x | — | x | x |
| 3 | — | — | x | x | x |
| 4 | x | x | — | x | x |
| 5 | x | — | x | x | x |
| 6 | — | x | x | x | x |
| 7 | x | x | x | x | x |
| 8 | — | — | — | — | — |

*Available from Peach States Labs, Rome GA

The Nylon-6 carpet samples were not solution dyed. To simulate dyeing, a water solution at pH 5.0-5.5 was applied to the samples, and the samples were steamed for 3 minutes at 100° C. The Nylon-6 carpet samples were rinsed, extracted and dried at 120° C. The treatment compositions of Table VIII were applied to the Nylon-6 carpet samples by foam application as set forth in Example 1.

The 8 treated Nylon-6 carpet samples were subjected to the Motor Oil Test as set forth in Section II herein. The 8 treated Nylon-6 carpet samples were also subjected to soil release testing in accordance with AATCC 130. The results of the testing are provided in Table IX.

TABLE IX

Motor Oil and Soil Release Testing Results

| | Nylon-6 Sample | | | | | | | |
|---|---|---|---|---|---|---|---|---|
| | 1 | 2 | 3 | 4 | 5 | 6 | 7 | 8 |
| Motor Oil Test | 4 | 2 | 2 | 4.5 | 4 | 2 | 4 | 1 |
| Soil Release (AATCC 130) | 2 | 3.5 | 2 | 3.5 | 2 | 3 | 4 | 1 |

As provided in Table VII, the Nylon-6 carpet sample (7) treated with a composition described herein comprising a fluoropolymer component, hydrophilic soil release polymeric component, hardening component and amphiphilic component demonstrated superior results in the Motor Oil Test and soil release testing. The remaining Nylon-6 carpet samples were deficient in one or both of the Motor Oil and soil release testing.

Example 3

Polytrimethylene Terephthalate (PTT) Hydrophilic Soil Release Component

One embodiment of polytrimethylene terephthalate (PTT) hydrophilic soil release component was produced as follows. Polyethylene glycol (PEG) 1450 obtained from Lambent Technologies (LUMULSE® PEG-1450) was placed into a reaction vessel and heated to a temperature of 255 to 270° C. under nitrogen. PTT fiber (triexta) was then fed into the reaction vessel to provide a reaction mixture according Table X.

TABLE X

PTT/PEG Mixture

| Component | Amount (wt. %) |
|---|---|
| PTT (triexta) | 25-35 |
| PEG 1450 | 65-75 |

The PEG/PTT mixture was maintained at a temperature of 255 to 270° C. for a time period of 4 to 6 hours followed by cooling to room temperature. The resulting PEG ethoxylated PTT was dispersed in water in an amount of 15% (w/w) to provide a hydrophilic soil release component.

Example 4

Treatment and Performance Polytrimethylene Terephthalate (PTT) Carpets

Three PTT carpet samples were fabricated with solution dyed PTT. Treatment compositions described herein were applied to PTT fibers of two of the carpet samples (1,2) as set forth in Table XI with the third carpet sample (3) serving as an untreated control.

TABLE XI

Treated PPT Carpet Samples

| PTT Carpet Sample | Fluoropolymer GEO 83 0.05-1.0% owf | Hydrophilic Soil Release PTT-PEG** 0.05-1.0% owf | Hydrophilic Soil Release Hydroperm T 0.05-1.0% owf | Hardening Component Polymer 52DM* 0.3-0.65% owf | Amphiphilic component Dowfax 2A1 0.02-0.15% owf |
|---|---|---|---|---|---|
| 1 | x | x | — | x | x |
| 2 | x | — | x | x | x |
| 3 | — | — | — | — | — |

*Available from Peach States Labs, Rome GA
**Produced in accordance with Example 2 hereinabove The treatment compositions of Table XI were applied to the PTT carpet samples by foam application as set forth in Example 1.

The three PTT carpet samples were subsequently subjected to the Motor Oil Test as set forth in Section II herein. The three PTT carpet samples were also subjected to soil release testing in accordance with AATCC 130. The results of the testing are provided in Table XII.

TABLE XII

Motor Oil and Soil Release Testing Results

| PTT Sample | 1 | 2 | 3 |
|---|---|---|---|
| Motor Oil Test | 5 | 5 | 1 |
| Soil Release (AATCC 130) | 4.5 | 4.5 | 3 |

As provided in Table XII, PTT carpet samples (1) and (2) treated with compositions described herein comprising a fluoropolymer component, hydrophilic soil release polymeric component, hardening component and amphiphilic component demonstrated superior results in the Motor Oil Test and soil release testing in comparison to control carpet sample (3).

Further, the PTT-based hydrophilic soil release agent applied to carpet sample (1) demonstrated the same level of performance as the PET-based hydrophilic soil release agent (Hydroperm T) applied to carpet sample (2). Soil applied to PTT carpet samples (1) and (2) did not adhere or substantially adhere to the PTT fibers and settled on the carpet backing at the base of the fibers. In resisting the applied soil, the PTT fibers did not discolor as in the control sample.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A composition for treating fibers comprising:
   a fluoropolymer component;
   a hydrophilic soil release polymeric component comprising polytrimethylene terephthalate modified with one or more hydrophilic species; and
   a water insoluble hardening component aqueous dispersion comprising an acrylate polymer or a mixture of acrylate polymer with one or more polymeric species having a glass transition temperature ($T_g$) greater than about 85° C.,
   wherein the water insoluble hardening component and hydrophilic soil release polymeric component are provided as product of polymerizing the acrylate polymer of polymeric species of the hardening component in the presence of the hydrophilic soil release component.

2. The composition of claim 1, wherein the composition is provided as an aqueous dispersion.

3. The composition of claim 1, wherein the fluoropolymer component is present at an add-on level of about 0.01% to about 3.0% on weight fiber.

4. The composition of claim 1, wherein the fluoropolymer component is present at an add-on level of about 0.05% to about 1.5% on weight fiber.

5. The composition of claim 1, wherein the fluoropolymer component comprises one or more fluorourethanes, fluoroacrylates, fluorinated urethane-acrylate copolymers or mixtures thereof.

6. The composition of claim 1, wherein the hydrophilic soil release polymeric component is present at an add-on level of about 0.01% to about 3.0% on weight fiber.

7. The composition of claim 1, wherein the acrylate polymer comprises monomeric species selected from the group consisting of acrylic acid, alkyl-acrylate, aryl-acrylate, alkyl-methacrylate and aryl-methacrylate.

8. The composition of claim 1, wherein the acrylate polymer of the hardening component comprises an acrylate copolymer.

9. The composition of claim 8, wherein the acrylate copolymer comprises co-monomer of styrene, styrene derivatives, acrylonitrile, acrylonitrile derivatives or combinations thereof.

10. The composition of claim 1, where in the hardening component further comprises polyacrylonitrile or polyacrylonitrile copolymer.

11. The composition of claim 10, wherein the polyacrylonitrile copolymer comprises co-monomer of styrene or styrene derivatives.

12. The composition of claim 1, wherein the $T_g$ of the one or more water-insoluble polymeric species is greater than about 100° C.

13. The composition of claim 1, wherein the hardening component is present at an add-on level of about 0.01% to about 2.0% on weight fiber.

14. The composition of claim 1, wherein the hardening component is present at an add-on level of about 0.03% to about 1.0% on weight fiber.

15. The composition of claim 1, further comprising an amphiphilic component comprising one or more surfactants, hydrotropic species or combinations thereof.

\* \* \* \* \*